United States Patent [19]
Jorgensen

[11] 4,162,823
[45] Jul. 31, 1979

[54] LENS MOUNT FOR PHOTOGRAPHIC RECORDING APPARATUS

[75] Inventor: Brian K. Jorgensen, Aloha, Oreg.

[73] Assignee: Tektronix, Inc., Beaverton, Oreg.

[21] Appl. No.: 847,373

[22] Filed: Oct. 31, 1977

[51] Int. Cl.² .............................................. G02B 7/04
[52] U.S. Cl. .................................. 350/252; 350/255; 350/286
[58] Field of Search .................. 350/252, 255, 257, 19, 350/37, 69, 183; 346/110 R; 355/20, 55; 354/75, 76, 80, 81, 159, 286

[56] References Cited

U.S. PATENT DOCUMENTS

| | | | |
|---|---|---|---|
| 2,381,228 | 8/1945 | Schmidt | 350/255 X |
| 2,853,925 | 9/1958 | Lee | 350/252 X |
| 3,118,360 | 1/1964 | Marjoram et al. | 354/76 X |
| 3,149,903 | 9/1964 | Merrick | 346/110 R |
| 3,259,008 | 7/1966 | Buck | 350/257 X |
| 3,544,199 | 1/1970 | Prochnow | 350/255 |

OTHER PUBLICATIONS

Hesse, Radio and Television News, Dec. 1949, pp. 62, 63 and 161.

*Primary Examiner*—F. L. Evans
*Attorney, Agent, or Firm*—William D. Haffner; Adrian J. La Rue; Kenneth M. Durk

[57] ABSTRACT

A lens mount in a camera assembly for use with a cathode-ray tube is provided. In particular there is provided a single body section spacer for insertion from one end of the lens assembly to the other end for changing the optical characteristics.

1 Claim, 5 Drawing Figures

LENS MOUNT FOR PHOTOGRAPHIC RECORDING APPARATUS

BACKGROUND OF THE INVENTION

In order to enable detailed inspection of the light pattern produced on the fluorescent screen of a cathode-ray display device, such as a cathode-ray tube or an X-ray image intensifier tube, it is often necessary to make a permanent recording of such pattern which can be stored for a subsegment relatively lengthy study. This is particularly true when the pattern is the trace of a transient phenomenon appearing on the face of a cathode-ray tube used in a cathode-ray oscilloscope. Conventional devices used to record such a trace are photographic cameras which are supported adjacent the face of a cathode-ray tube and which have provision for a viewing device for visually observing the trace as the camera is recording it on film.

Still another disadvantage with which the prior cathode-ray tube cameras are associated is the fact that they do not provide for quickly and simply setting for a precise magnification of the recorded image or for easily changing the magnification of the recorded image without refocusing the camera, i.e., to get film images of different sizes relative to the cathode-ray screen trace. For example, a ratio of 1.0 between the film image and the cathode-ray tube may be desired for a full size image on a 4" by 5" film or a ratio of 0.9 for an image of maximum size on a 72 mm by 96 mm film.

Since the relative size of the film image is varied by varying the distance of the lens from the film, various techniques have been set out. For example, a bellows type camera might be used but such camera has produced complications involved in providing necessary additional support structure for the camera lens as only a rigid camera body construction is acceptable in combination with a rigid camera-supporting clamp housing on a typical oscilloscope arrangement. Another type of prior art suggests the provision of a camera in modular form so that it may be quickly disassembled into its various components in order to enable the interchange of lenses having different optical characteristics such as focal length and maximum f-stop rating, and the interchange of lenses having different preset magnifications built into their lens mounts for changing the scale of the recorded image. While this type of prior art provides for a structure for varying the magnification of the lens while maintaining constant the respective distances from an object plane and an image plane which is simple and versatile, the solution is not fully satisfactory because of the necessity of keeping accessory lenses for the various focal lengths required which are quite expensive.

The most prevalent prior art solution is to provide so-called spacers or separate body sections for insertion to increase the distance between the camera lens and the film, there being one set of spacers of different dimensions to be inserted selectively for producing selected image ratios. This art is also not fully satisfactory because of the necessity of keeping a set of accessories available and because of the possibility of damaging, mislaying or losing one of the accessories and because of refocusing requirements.

SUMMARY OF THE INVENTION

The present invention seeks to solve most of the problems associated with the prior art and in particular the most prevalent prior art by providing a lens mount in a camera assembly for use with a cathode-ray tube wherein is mounted a single body section spacer for insertion from one end of the lens assembly to the other end of the lens assembly for changing the optical magnification without the need of refocusing.

It is therefore an object of the present invention to provide an improved optical apparatus having provision for presetting the magnification of lenses when employed in such a system.

A further object of the present invention is to provide an improved lens mounting structure for varying the magnification of the lens in an optical device while maintaining constant the respective distances from an object plane and an image plane.

It is still yet another object of the present invention to provide a lens mount which consists of a single body section spacer for insertion from one end of the lens to the other end of the lens for changing the optical characteristics which operation is both simple and versatile.

The subject matter of the present invention is particularly pointed out and distinctly claimed in the concluding portion of this specification. The invention, however, both as to organization and method of operation together with further advantages and objects thereof, may best be understood by reference to the following description taken in connection with the accompanying drawings. It is to be understood, however, that the embodiment shown and described sets forth only one mode contemplated by the inventor and is not intended to be limiting nor exhausting of the invention, and is given for the purpose of illustration in order that others skilled in the art may fully understand the invention and principles thereof and the manner of applying it in practical use so that they may modify it in various forms, each as may best suit the conditions of the particular use.

DESCRIPTION OF THE INVENTION

Figure 1:
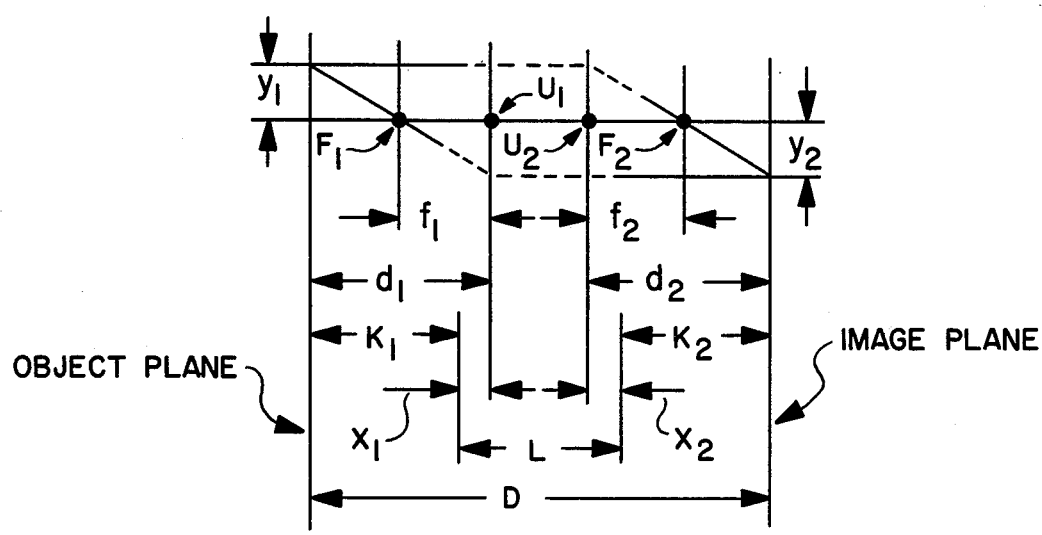
FIG. 1 is a diagram useful in explaining the operation of a camera in accordance with conventional practices.

Referring to FIG. 1 which is a diagram useful in explaining the operation of a camera assembly to make clear the dimensional relationships required for changing the relative size of the film image, any lens system having lens elements fixed in position in a lens barrel or other carrier can be considered to have four fixed points $F_1$, $U_1$, $U_2$ and $F_2$ on its axis. The point $F_1$ can be called the object focal point and is the point at which light rays parallel to the axis and entering the image end of the lens system coverage. The point $F_2$ can be called the image focal point and is the point at which light rays entering the object end of the lens system converge. The point $U_1$ can be called the object unit point and is the point which is at the distance from $F_1$ at which the projection of a ray parallel to the axis and entering the lens system from the image end intersects the projection of its continuation through $F_1$. The point $U_2$ can be called the image unit point and is the point which is at the distance from $F_2$ at which the projection of a ray parallel to the axis and entering the object end of the lens intersects the projection of its continuation through $F_2$. If the object plane is in focus on the image plane it is known from elementary optics that:

$$d1 = f1 \left(1 + \frac{1}{m}\right), \quad (a)$$

(b) $d2 = f2(1+m)$, and $$\frac{d2}{d1} = m\frac{f2}{f1} \quad (c)$$

where f1 being the object focal length of the lens, f2 is the image focal length on the lens and $$m = \frac{y2}{y1}, \quad (d)$$

where m is the magnification and is considered to be positive in the above equations even though the image having very similar or considerable different focal lengths or distances U between their unit points could be preset to give any desired magnification between wide limits and at the same time provide precise focus of the object plane upon the image plane without any adjustment of the camera except to install a given lens structure. Thus, any lens structure within wide limits could be preset to give a precise magnification or image ratio and precise focus in the camera independently of its focal length, speed, or distance between its unit points. Under these conditions, the distance L between the reference surfaces on the lens structure would vary for different lenses and the same is true of the distance D between the object and image plane, but many different lenses could be present to give the same magnification and the precise focus is reversed in passing through the lens.

From this figure, it can therefore be seen that for a camera system to produce an image ratio of, say 1.0, i.e., to make the film image of a cathode-ray trace exactly equal in size to the actual trace on the cathode-ray screen, the distance from the object point $U_1$ and the object plane must be equal to the distance from image point $U_2$ to the image plane. Heretofore, the prior art such as taught in U.S. Pat. No. 3,149,903 utilized two reference surfaces on each lens structure which are positioned at fixed distances from the object plane and the image or film planes of the camera for providing a camera system to enable changing the size of the recorded image; the distance $K_1$ and $K_2$. Further, the distances $X_1$ and $X_2$ for any one of a large number of lenses discussed above as the relationships for any given lens are:

$$X_1 = f1 \left(1 + \frac{1}{m}\right) - K_1 \text{ and} \quad (e)$$

(f) $X_2 = f2(1+m) - K_2$.

Figure 2:
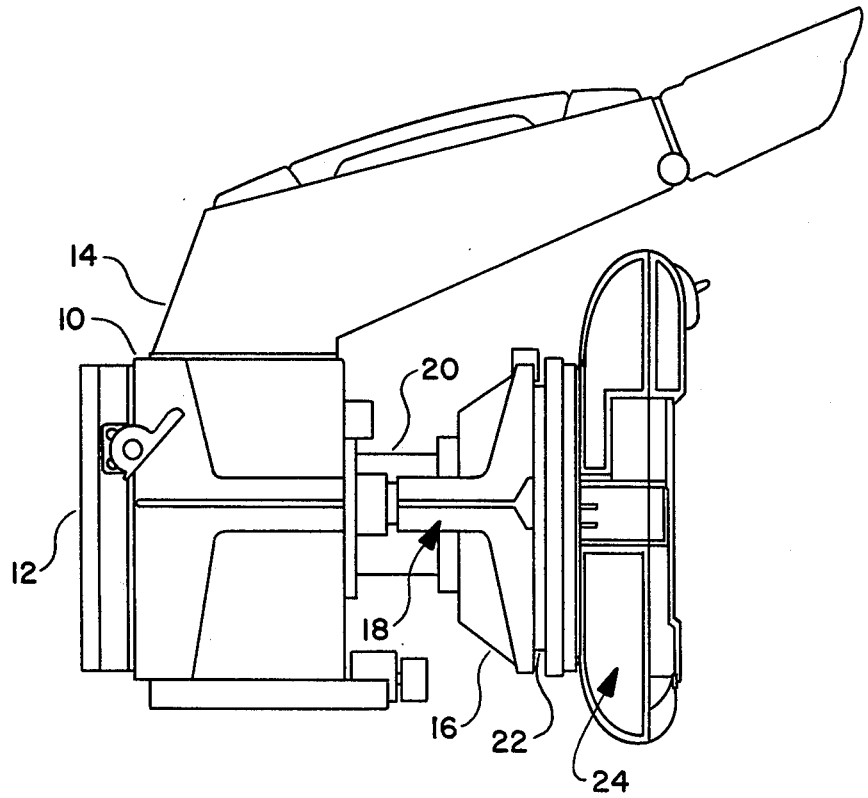
FIG. 2 is a side elevation of an oscilloscope camera utilizing the present invention.

The present invention, however, utilizes and teaches a single body section for insertion on one end of the lens structure to increase the distance between the camera lens and the film for one magnification and interchangeably inserted on the other end of the lens structure to increase the distance between the camera lens and the object plane for a second magnification to thereby overcome the disadvantages of the prior art. This is shown in FIG. 2 wherein is shown a side elevation of the oscilloscope camera through an assembly for use with in a cathode-ray tube. In this figure, the camera includes a front portion 10 having a mounting plate 12 secured to its forward end, which mounting plate can be secured to a cathode-ray oscilloscope for attaching the camera to such oscilloscope. The camera may also have a viewing hood 14 secured to its top for observing the trace on the phosphor of the cathode-ray tube of the oscilloscope. The camera also includes a rear portion 16 attached to the forward portion by adjustable attaching structures 18, one on each side of the camera, and a lens structure 20 including the interchangeable single body spacer according to the present invention, the lens structure 20 held in position between the front and rear portions of the camera. The rear portion of the camera also includes a mounting plate 22 forming part of a detachable film holder 24 shown as the body portion of a commercial type of film developing camera. As the above mentioned components, except for the lens structure 20, form no part of the inventive or novel features of the invention and are included only to set forth the best mode contemplated by the inventor for carrying out his invention, no further detailed discussion is believed necessary. However, for those desiring additional information, reference is again made to U.S. Pat. No. 3,149,903 as well as to U.S. Pat. No. 3,118,360, both of which are concerned with camera assemblies especially for camera assemblies associated with a cathode-ray tube.

Figure 3:
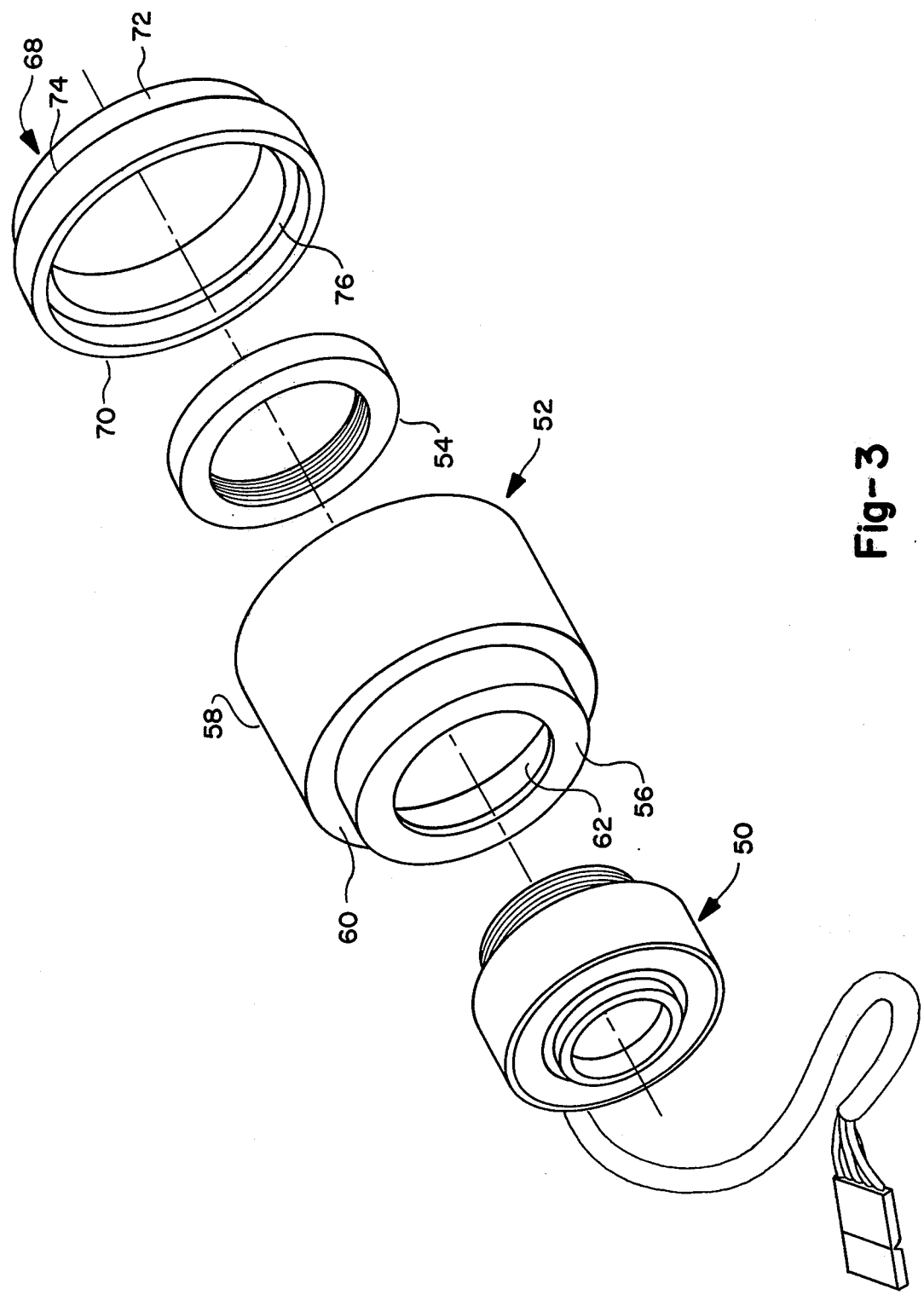
FIG. 3 is an exploded view of the lens structure according to the present invention.
Figure 4:
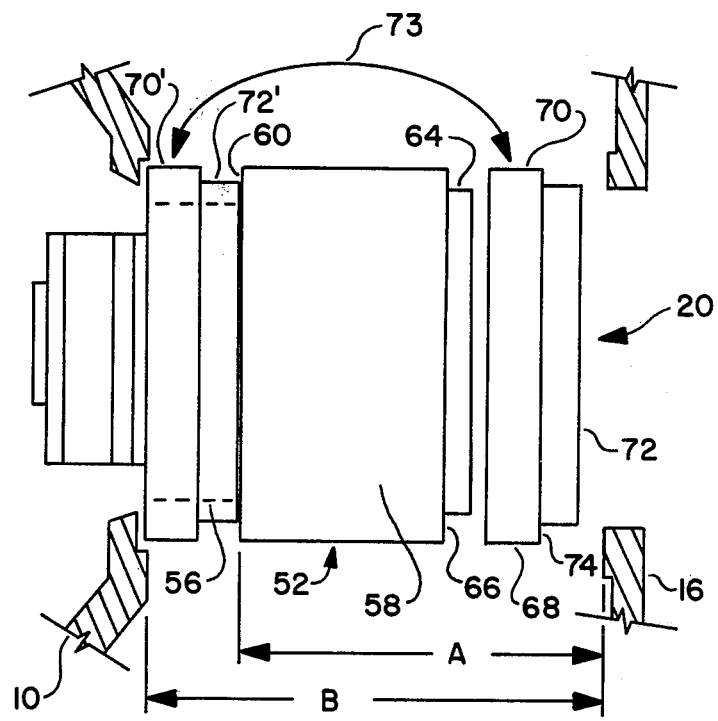
FIG. 4 is a plan view of the lens structure according to the present invention for detailing the reversable spacer.

Referring now to FIG. 3 which is an exploded view of lens structure 20, there is shown a lens and electronic shutter portion 50 which is removably fastened to a tubular cylindrical sleeve 52 by way of a nut 54. (In the embodiment shown and to be hereinafter described, the lens and electronic shutter portion 50 is an F2.8, 56 mm lens and No. 1 Synchro Electronic shutter both manufactured by the ILEX OPTICAL COMPANY.) Sleeve 52 is preferably a single body unit made of aluminum and has a first portion 56 and an adjacent second portion 58 somewhat higher than portion 56 to provide a shoulder 60. It should be mentioned that the aperture 62 through which the lens and electronic shutter is fastened is somewhat smaller in diameter than the diameter of the cavity to enable nut 54 to securely fasten the lens and electronic shutter. As best shown in FIG. 4, sleeve 52 also has a third portion 64 somewhat lower than the portion 58 but higher than the portion 56 to provide yet another shoulder 66.

Slideably received on third portion 64 to abut with shoulder 66 is the unique single body section spacer 68 according to the present invention. Spacer 68 is also a tubular cylindrical sleeve preferrably a single body unit made of aluminum and has a first portion 70 and a second portion 72 with portion 70 adjacent and higher than portion 72 to form a shoulder 74. The spacer 68 also has a third shoulder 76 which cooperates with the third portion 64 of sleeve 52. Once the lens and electronic shutter portion 50 is fastened to sleeve 52 by way of nut 54, and spacer 68 is mounted on sleeve 52, the lens structure 20 is completed and is placed so that shoulder 60 abuts with a cooperating area of the camera front portion 10 (see FIG. 1) and so that shoulder 74 abuts with a cooperating area of the camera rear portion 16.

The camera is then attached together by adjustable attaching structures 18, one on each side of the camera.

Alternatively, as is one novel aspect of the invention, and which is shown in FIG. 4, spacer 68 may be slideably mounted on the other end of sleeve 52 so that second portion 72 thereof abuts with the shoulder 60 to change the magnification as indicated by double headed arrow 73. In this position, the lens structure 20 is placed so that shoulder 66 of sleeve 52 abuts the cooperating area of the camera rear portion 16 whereas an edge 78 of spacer 68 abuts with the cooperating area of the camera front portion 10. Again, the camera is then attached together by adjustable attaching structures 18, one on each side of the camera. In order to change magnification, the dimension A must change in relation to the rear portion 16 of the camera half. Also, because of the nature of the lens as previously explained, when dimension A is changed the focus will change. However, by using the novel feature of the invention as described, a dimension B is automatically changed when the magnification ratio is changed thereby eliminating the need to refocus the camera.

Figure 5:
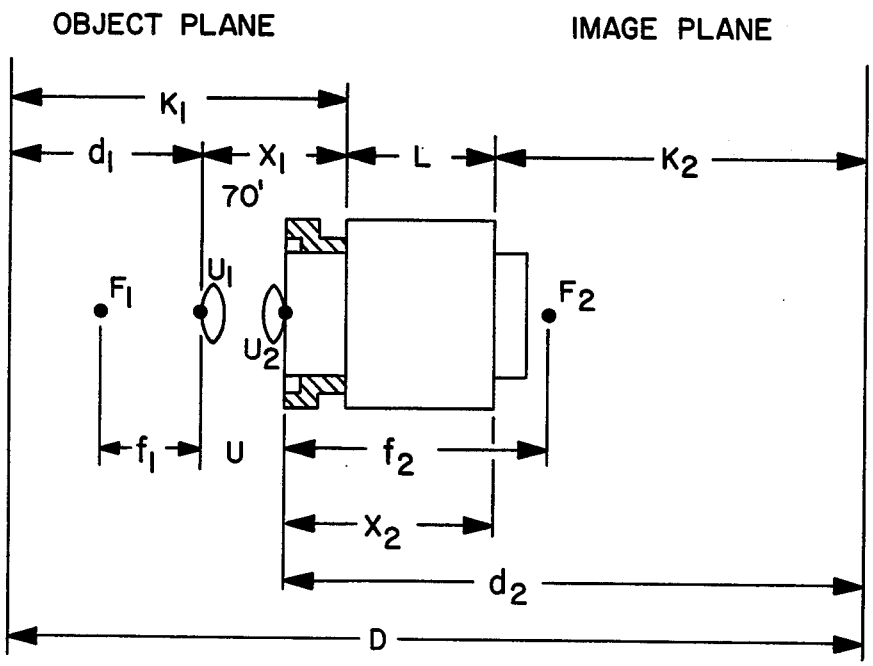
FIG. 5 is an additional diagram useful in practicing the unique aspects of the present invention.

Finally, as there are many magnification ratios which are not exclusive, reference should be made to FIG. 5 and the following table 1 which sets forth some of the various magnification ratios available when using the mentioned 52 mm lens. The information in FIG. 5 can easily be compared to the optical characteristics shown in FIG. 1 and utilizing the dimensions in Table 1, it is believed that a person having ordinary skill in the art can utilize the invention without undue experimentation.

TABLE 1

| MAGNIFICATION | L | $X_2$ | $d_2$ | D |
|---|---|---|---|---|
| 1.05 | 1.370 | 2.165 | 4.500 | 9.000 |
| 1.04 | 1.370 | 2.135 | 4.470 | 9.000 |
| 1.00 | 1.370 | 2.040 | 4.375 | 9.000 |
| 0.90 | 1.400 | 1.825 | 4.160 | 9.030 |
| 0.85 | 1.445 | 1.720 | 4.055 | 9.075 |
| 0.80 | 1.490 | 1.615 | 3.950 | 9.120 |
| 0.76 | 1.545 | 1.535 | 3.870 | 9.175 |
| 0.67 | 1.670 | 1.375 | 3.710 | 9.300 |

NOTE: L, $X_2$, $d_2$ and D are in inches.

While there has been shown and described the preferred embodiment of the present invention, it will be apparent to those skilled in the art that many changes and modifications may be made without departing therefrom in its broader aspects. Therefore, the appended claims are intended to cover all such changes and modifications as fall within the true spirit and scope of this invention.

The invention is claimed in accordance with the following:

1. A lens structure for use in a photographic recording apparatus including an image plane, an object plane, and film, the lens structure comprising:
   a tubular cylindrical mounting sleeve having a first mounting shoulder on one end thereof and a second mounting shoulder on the other end thereof;
   a lens assembly removably attached to said mounting sleeve; and
   a tubular cylindrical spacer interchangeably mounted on said first or said second mounting shoulder to increase the distance between said lens assembly and the film in the first instance and to increase the distance between the lens assembly and the object plane in the second instance, thereby providing two different magnification ratios without refocusing.

* * * * *

UNITED STATES PATENT AND TRADEMARK OFFICE
CERTIFICATE OF CORRECTION

PATENT NO. : 4,162,823
DATED : July 31, 1979
INVENTOR(S) : BRIAN KAI JORGENSEN

It is certified that error appears in the above-identified patent and that said Letters Patent are hereby corrected as shown below:

Col. 2, line 64, change "coverage" to --converge--.

Col. 3, line 13, change "(b) d2=f2(1+m), and" to --d2=f2(1+m), and-- with the --(b)-- lined up on the right margin.

Col. 3, line 63, change "(f) $X_2(1+m)-K_2$" to --$X_2=f2(1+m)-K_2$-- with the --(f)-- lined up with the right margin.

Signed and Sealed this

Twenty-third Day of October 1979

[SEAL]

Attest:

RUTH C. MASON
Attesting Officer

LUTRELLE F. PARKER
Acting Commissioner of Patents and Trademarks